United States Patent [19]
Molaskey et al.

[11] 3,785,699
[45] Jan. 15, 1974

[54] WIND DEFLECTOR FOR AUTOMOBILES

[76] Inventors: Charles E. Molaskey, 11408 Youngstown-Pittsburgh Rd., New Middletown, Ohio 44442; Charles O. Starkey, R.D. 1, Edinburg, Pa. 16116

[22] Filed: June 26, 1972

[21] Appl. No.: 266,287

[52] U.S. Cl. ................................. 296/152, 98/2.12
[51] Int. Cl. ................................................ B60j 1/20
[58] Field of Search ...................... 296/152; 98/2.12, 98/2.13

[56] References Cited
UNITED STATES PATENTS

| | | |
|---|---|---|
| 2,610,566 | 9/1952 | Schreckengost ...................... 98/2.12 |
| 2,599,014 | 6/1952 | Pritchard ............................ 296/152 |
| 2,550,619 | 4/1951 | Sutherland ........................... 98/2.12 |

*Primary Examiner*—Kenneth H. Betts
*Assistant Examiner*—John A. Pekar
*Attorney*—Webster B. Harpman

[57] ABSTRACT

A wind deflector for automobiles comprises an elongated cross sectionally arcuate member having a longitudinally extending flange along one edge thereof and offset with respect thereto the flange having a plurality of notches cut therein whereby the flange may be positioned between the window frame member and a trim and/or sealing piece thereon so as to mount the wind deflector thereto at the forward edge of the window opening.

2 Claims, 3 Drawing Figures

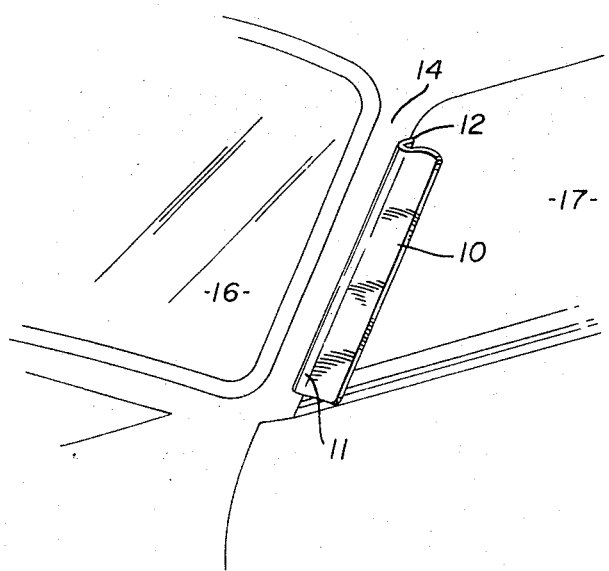
FIG. 1
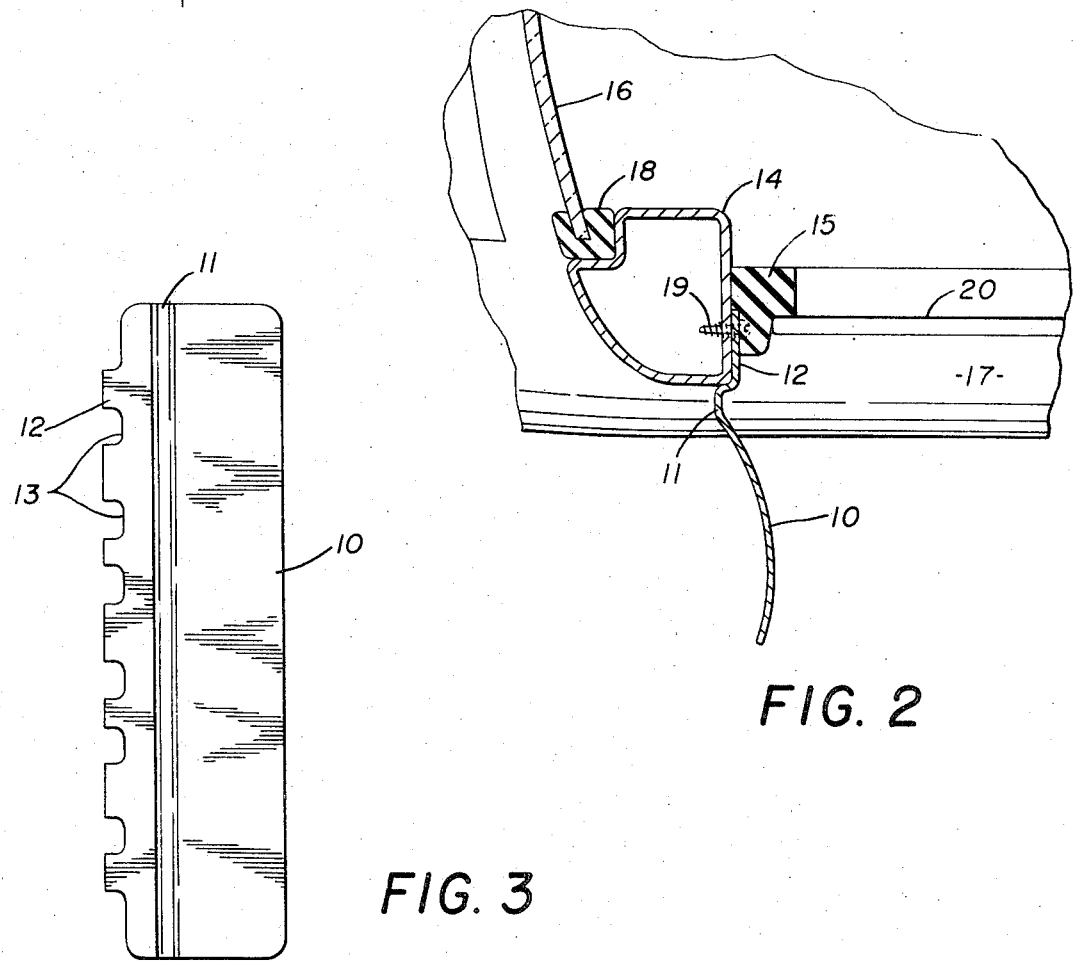
FIG. 2
FIG. 3

WIND DEFLECTOR FOR AUTOMOBILES

BACKGROUND OF THE INVENTION

1. Field of the Invention

This invention relates to wind deflectors of the type mounted on automobile bodies adjacent window openings therein so as to direct wind currents away from the window opening.

2. Description of the Prior Art

Prior structures of this type have generally utilized deflectors formed of transparent material such as glass and positioned them in hinged relation to the corner post or window frame of the window opening so that they could be adjusted with respect thereto (see U.S. Pats. No.'s 2,478,161, 2,519,446, 2,816,795, and 2,933,344).

This invention relates to an improved wind deflector of a simple one piece construction that deflects wind and air currents only sufficiently to eliminate noises caused by turbulence flowing around the corner posts of an automobile body relative to a closed or open window adjacent thereto.

SUMMARY OF THE INVENTION

A wind deflector for automobiles consists of an elongated section of strip-like material such as chrome plated sheet metal or transparent plastic such as a synthetic resin of arcuate transverse section with an offset flat projecting flange along one edge. The flange is provided with a plurality of longitudinally spaced notches inwardly of the outer edge thereof to facilitate positioning of the flange between the corner post of an automobile body defining window opening and the trim and/or weather sealing strip thereon so as to mount the wind deflector in air sealing relation thereto.

DESCRIPTION OF THE DRAWINGS

FIG. 1 is a schematic illustration of a portion of an automobile body including the front corner post defining a portion of a window opening therein and illustrating the wind deflector mounted thereon.

FIG. 2 is an enlarged cross sectional detail of a front corner post of an automobile body showing the wind deflector.

FIG. 3 is a plan view of the wind deflector.

DESCRIPTION OF THE PREFERRED EMBODIMENT

In its simplest form the wind deflector for automobiles comprises an elongated section 10 of strip material of arcuate transverse section throughout a majority of its width. A longitudinally extending relatively wide rib 11 is positioned inwardly from one edge thereof with the adjacent edge portion forming a transversely and longitudinal flat flange 12 in which a plurality of notches 13 are formed with respect to its outermost edge. When the device is formed of thin strip metal or synthetic resin the thickness of the flange 12 is such that it may be readily inserted alongside a corner post 14 of an automobile body by slightly distorting the trim and/or weather sealing section or member 15 normally mounted thereon. In FIG. 1 of the drawings the automobile body is shown with the corner post 14 positioned between one side of a windshield 16 and a window opening 17. In FIG. 2 of the drawings an enlarged cross sectional detail of a typical corner post construction of an automobile may be seen with the windshield 16 secured thereagain by a sealing and mounting fitting 18 with the weather sealing section 15 also secured thereto usually by fasteners 19. The movable window in the automobile body as seen in FIG. 2 of the drawings is indicated by the numeral 20 and engages against the weather sealing section 15 as will be understood by those skilled in the art.

By referring now to FIG. 3 of the drawings it will be seen that the wind deflector body 10 is so arranged with respect to the longitudinally extending rib 11 and the flat flange 12 extending therebeyond, that the flat flange 12 may be positioned against the corner post 14 and pushed into self-retaining location by reason of the resiliant nature of the weather sealing section or member 15. The notches 13 permit the wind deflector 10 to be moved sufficiently to engage the fasteners 19 in the notches 13 and thus permit the installation of the device. The longitudinally extending rib 11 forms a guide and insures a sealing fit of the longitudinal edge of the wind deflector with respect to the corner post 14. It will thus be seen that a wind deflector has been disclosed which is particularly suitable for eliminating the turbulent air currents that flow around the corners of automobile bodies and particularly the front corner posts and cause objectionable noise. The wind deflector will also direct the air currents away from the window opening. Although but one embodiment of the present invention has been illustrated and described, it will be apparent to those skilled in the art that various changes and modifications may be made therein without departing from the spirit of the invention.

We claim:

1. A wind deflector for an automobile body having a corner post, a weather sealing member positioned thereagainst and fasteners positioned therethrough; said wind deflector consisting of a longitudinally extending transversely arcuate section of thin material of a length sufficient to span the vertical dimension of a window in said body adjacent said post and having a transversely flat flange along one edge, notches formed inwardly of the outer edge of said flat flange for registry with said fasteners whereby said flat flange may be positioned between said corner post of said automobile body and said weather sealing member mounted thereon so as to hold and locate the wind deflector outwardly thereof, said transversely flat flange terminating inwardly from the opposite ends of the wind deflector so as increase the relative width of the remainder thereof, and a longitudinally extending rib between said arcuate and flat sections for insuring a sealing fit with said corner post.

2. The wind deflector set forth in claim 1 and wherein the wind deflector is formed of thin transparent sheet material and the transversely arcuate shape thereof is aerodynamically formed to direct air currents thereabout so as to lessen turbulence and noise resulting therefrom.

* * * * *